(12) United States Patent
Mochizuki et al.

(10) Patent No.: US 12,305,919 B2
(45) Date of Patent: May 20, 2025

(54) METAL MELTING APPARATUS, SCREEN PLATE FOR METAL MELTING, AND METHOD OF MELTING METAL

(71) Applicant: TOUNETSU CO., LTD., Shizuoka (JP)

(72) Inventors: Kiyata Mochizuki, Shizuoka (JP); Tomihiro Iwamoto, Shizuoka (JP)

(73) Assignee: TOUNETSU CO., LTD., Shizuoka (JP)

( * ) Notice: Subject to any disclaimer, the term of this patent is extended or adjusted under 35 U.S.C. 154(b) by 590 days.

(21) Appl. No.: 17/637,345

(22) PCT Filed: Nov. 10, 2020

(86) PCT No.: PCT/JP2020/041950
§ 371 (c)(1),
(2) Date: Feb. 22, 2022

(87) PCT Pub. No.: WO2021/095731
PCT Pub. Date: May 20, 2021

(65) Prior Publication Data
US 2022/0307768 A1  Sep. 29, 2022

(30) Foreign Application Priority Data

Nov. 15, 2019 (JP) .................................. 2019-207478
Nov. 15, 2019 (JP) .................................. 2019-207479
Nov. 15, 2019 (JP) .................................. 2019-207480

(51) Int. Cl.
*C22B 9/16* (2006.01)
*F27B 3/04* (2006.01)
(Continued)

(52) U.S. Cl.
CPC ................ *F27B 3/045* (2013.01); *C22B 9/16* (2013.01); *F27B 3/19* (2013.01); *F27B 3/22* (2013.01);
(Continued)

(58) Field of Classification Search
CPC .... F27B 3/045; F27B 3/19; F27B 3/22; F27B 3/10; C22B 9/16; C22B 9/055;
(Continued)

(56) References Cited

U.S. PATENT DOCUMENTS 4,533,388 A * 8/1985 Tyler ....................... C22B 9/023
75/411
4,790,873 A * 12/1988 Gesing .................... C22B 9/023
75/412
(Continued)

FOREIGN PATENT DOCUMENTS

CA 1311919 C 12/1992
DE 155958 A5 * 7/1982
(Continued)

OTHER PUBLICATIONS

DD 155958, machine translation. (Year: 1982).*
International Search Report for PCT/JP2020/041950, dated Jan. 26, 2021.

*Primary Examiner* — John A Hevey
(74) *Attorney, Agent, or Firm* — Andrus Intellectual Property Law, LLP

(57) ABSTRACT

A metal melting apparatus capable of providing a clear melt with little oxides, even when either one or a mixture of scrap material and fresh material is supplied. Solution is provided by a metal melting apparatus including melting chamber to which a melt raw material is supplied, and gas injection system for injecting gas into melt in the melting chamber to generate a vortex of melt in the melting chamber.

5 Claims, 14 Drawing Sheets

(51) Int. Cl.
*F27B 3/19* (2006.01)
*F27B 3/22* (2006.01)
*F27D 3/14* (2006.01)
*F27D 27/00* (2010.01)

(52) U.S. Cl.
CPC ............... *F27D 3/14* (2013.01); *F27D 27/00* (2013.01); *F27D 2027/002* (2013.01)

(58) Field of Classification Search
CPC ..... C22B 21/066; C22B 21/0092; F27D 3/14; F27D 27/00; F27D 2027/002; Y02P 10/20; B22D 41/01; B22D 43/004
See application file for complete search history.

(56) References Cited

U.S. PATENT DOCUMENTS

| | | | | |
|---|---|---|---|---|
| 5,336,295 A | * | 8/1994 | DeYoung | C22B 21/066 75/412 |
| 5,984,999 A | * | 11/1999 | Areaux | C22B 21/0092 266/233 |
| 2002/0185790 A1 | * | 12/2002 | Klingensmith | F27B 3/205 266/81 |
| 2013/0022436 A1 | * | 1/2013 | Geib | F27D 1/1678 414/586 |

FOREIGN PATENT DOCUMENTS

| | | |
|---|---|---|
| JP | 50-092807 | 7/1975 |
| JP | 54-026907 | 2/1979 |
| JP | 63-60211 | 3/1988 |
| JP | 63-121612 | 5/1988 |
| JP | H2-219978 | 9/1990 |
| JP | 10-226827 | 8/1998 |
| JP | 2001-74375 | 3/2001 |
| JP | 2007-285679 | 11/2007 |
| JP | 2009293096 A | 12/2009 |
| JP | 2010-005647 | 1/2010 |
| JP | 2010-096403 | 4/2010 |
| JP | 2013-060629 | 4/2013 |
| JP | 2019098396 A | 6/2019 |
| JP | 2019-183275 | 10/2019 |
| WO | 2017/051586 | 3/2017 |

* cited by examiner

[FIG.1]
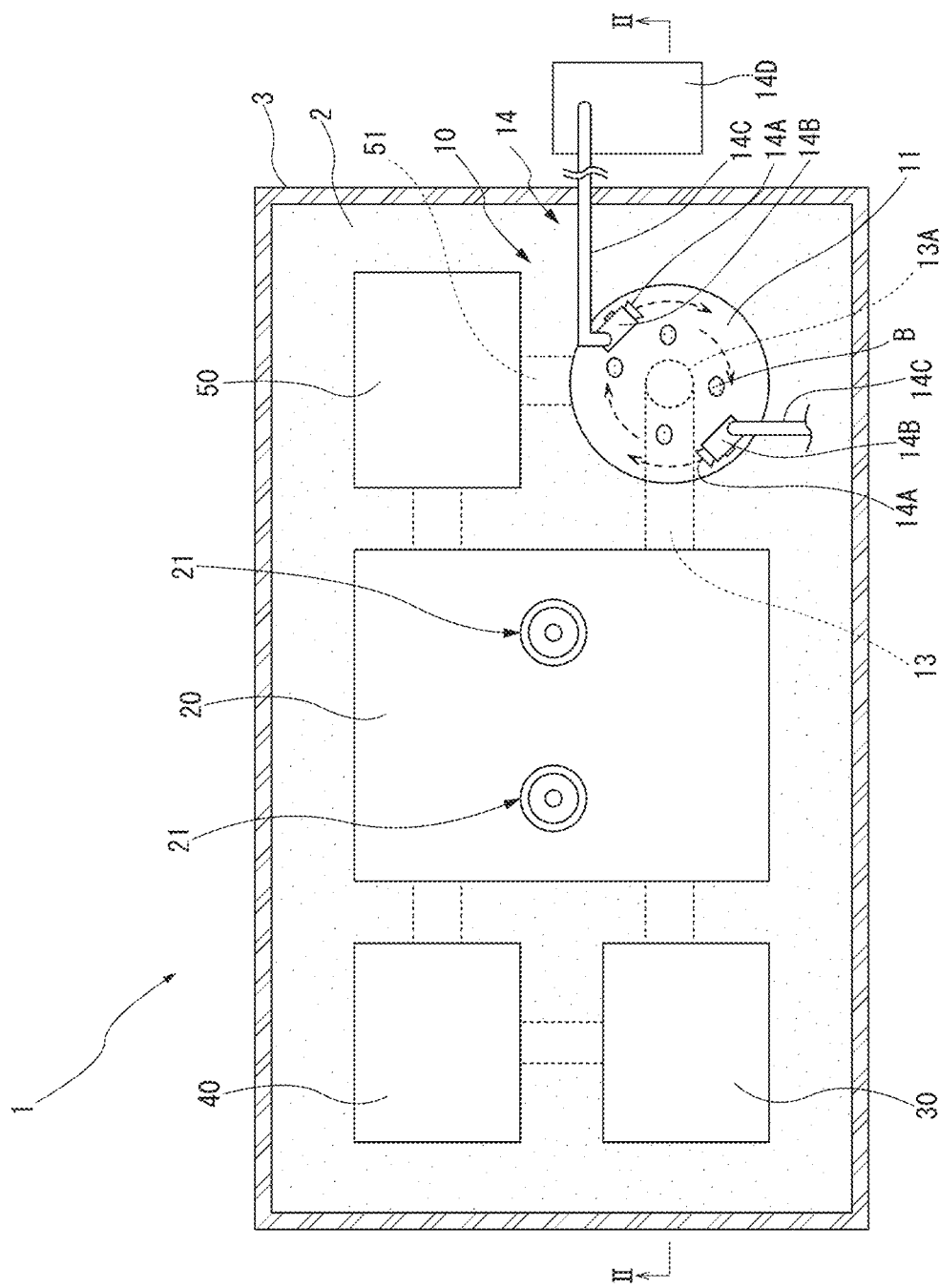

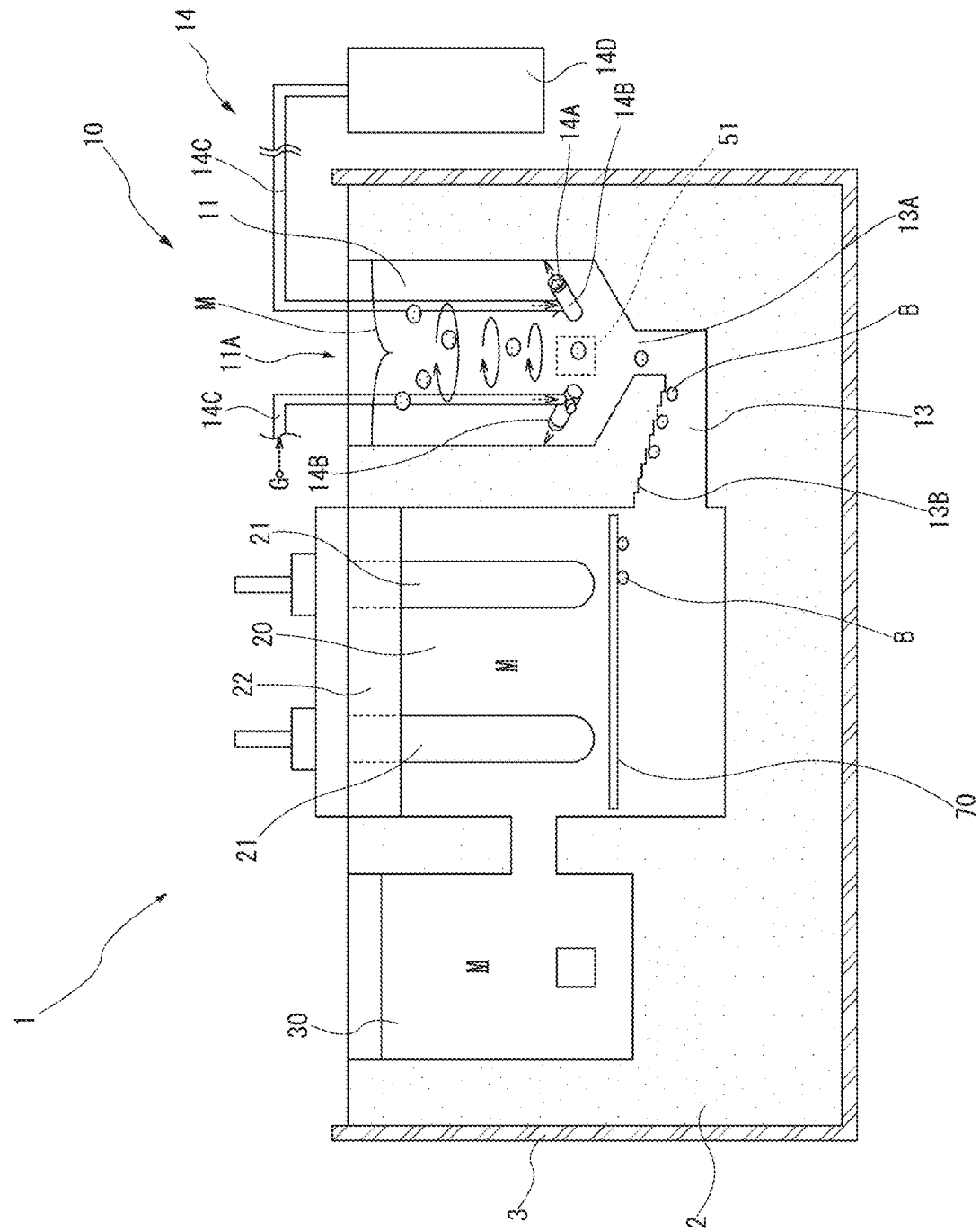

[FIG.3]
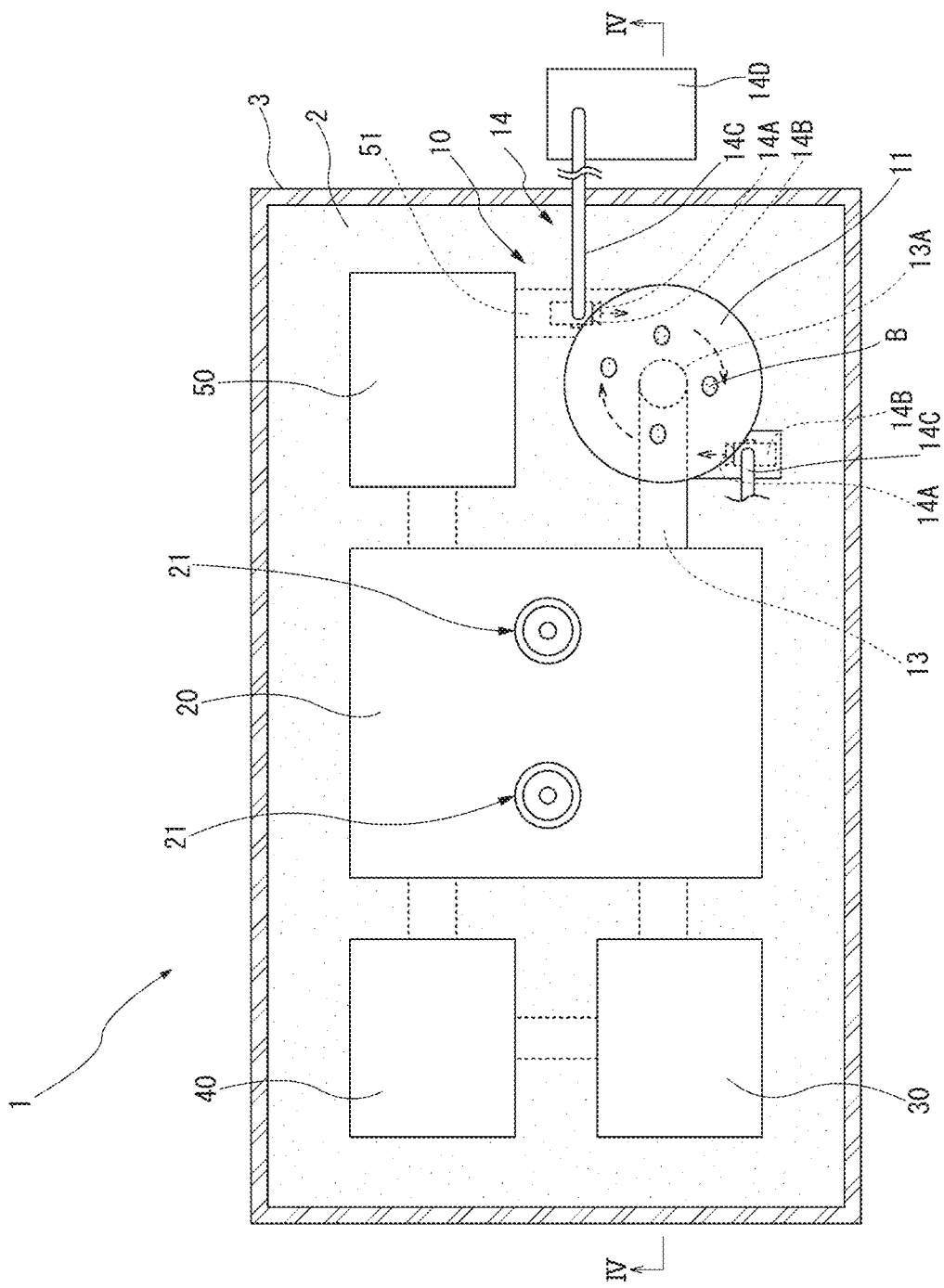

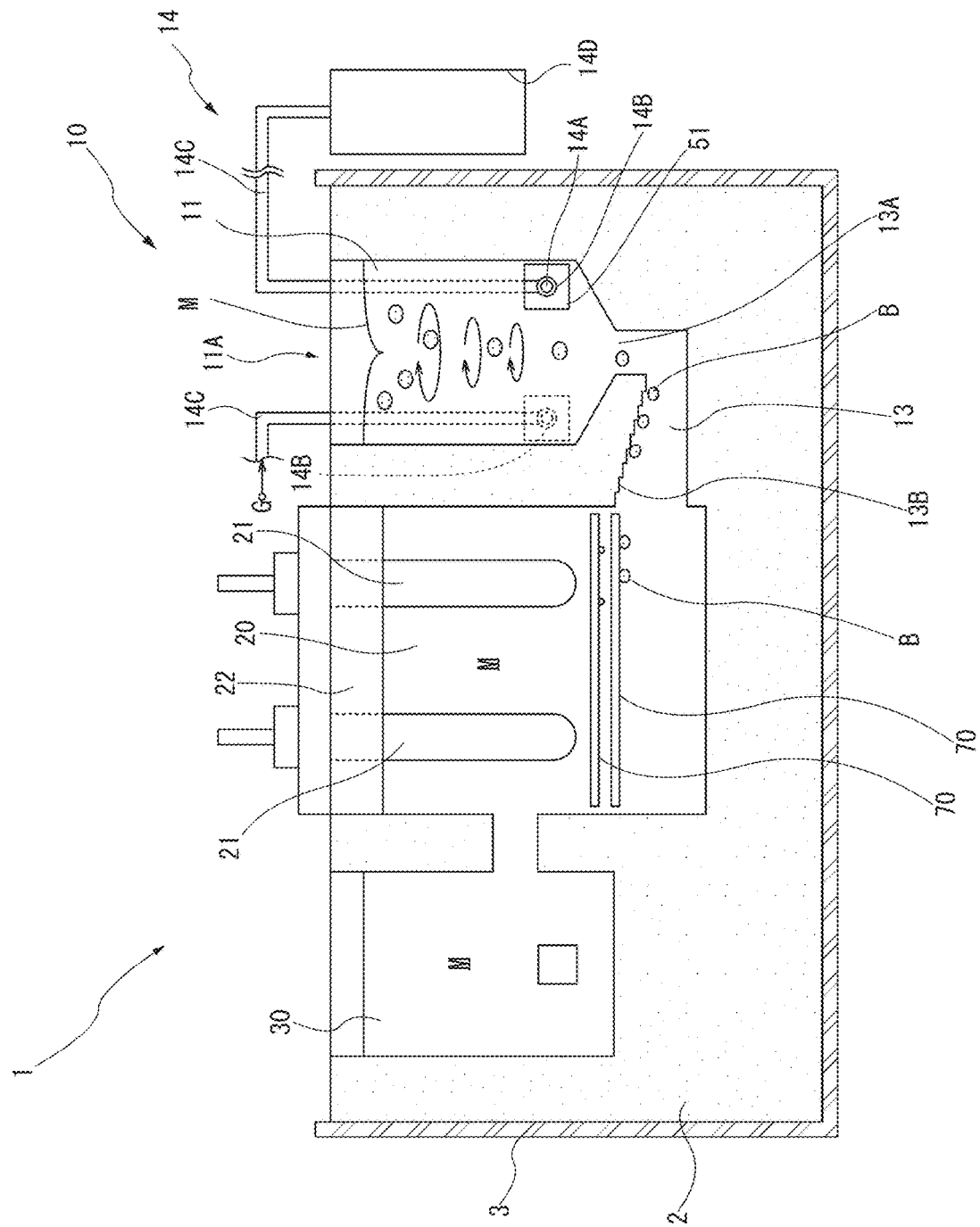
[FIG.4]

[FIG.5]
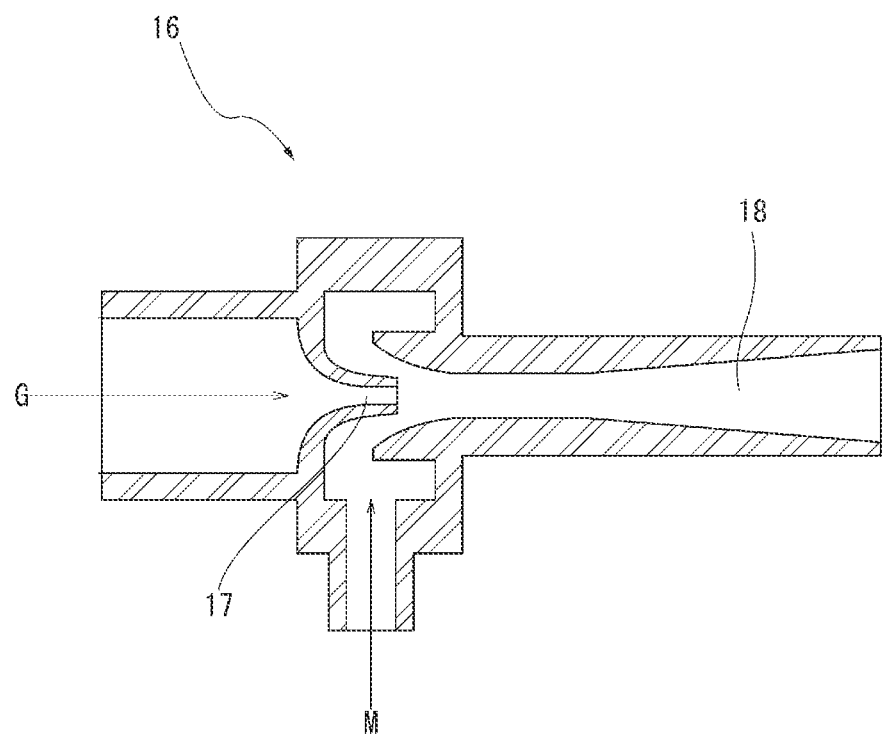

[FIG.6]
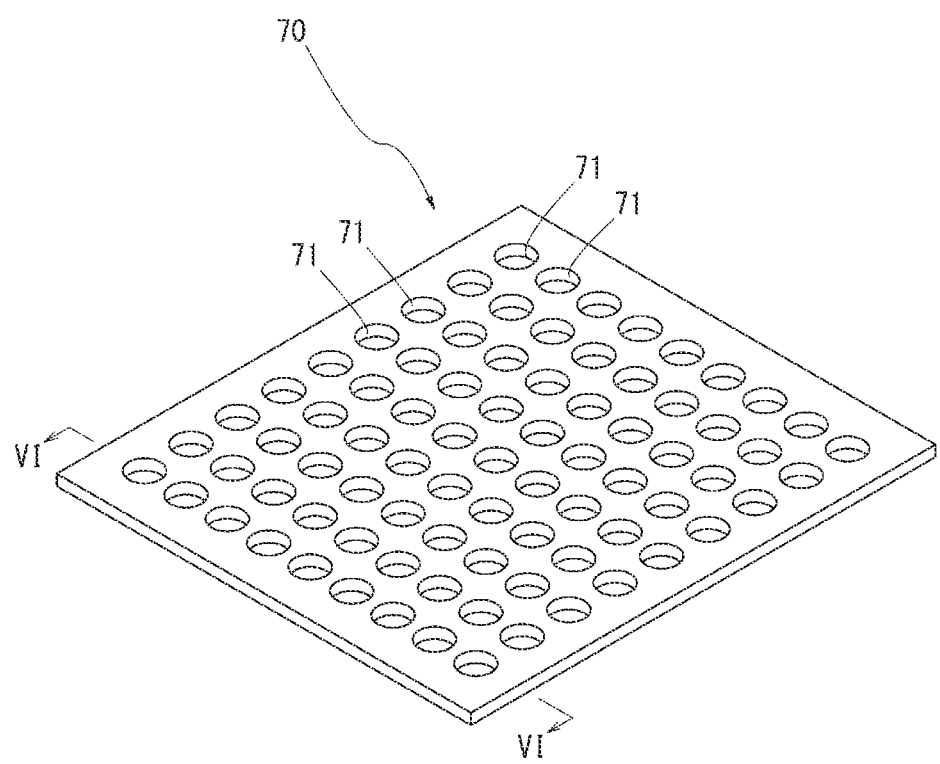

[FIG.7]
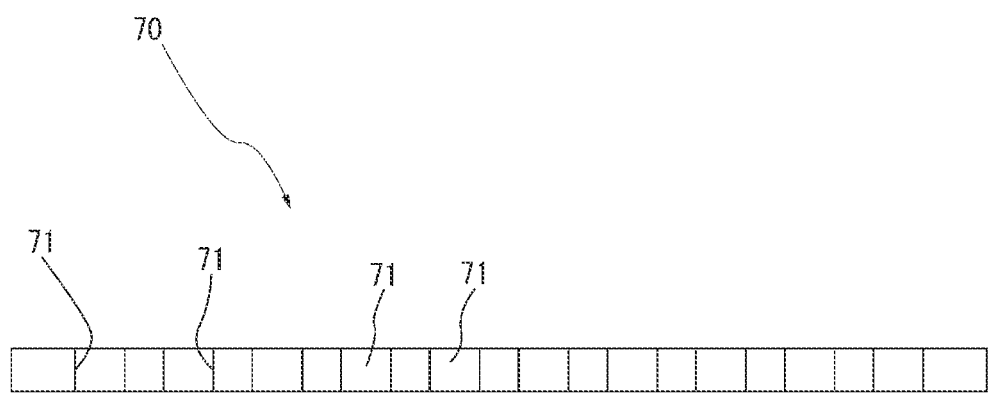

[FIG.8]
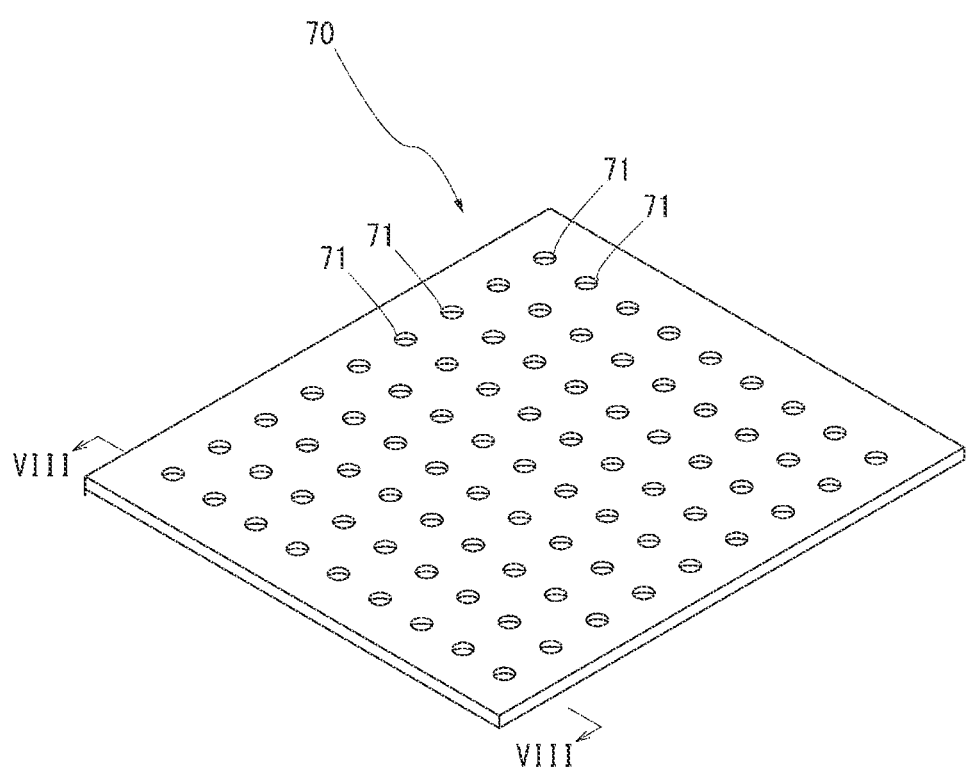

[FIG.9]
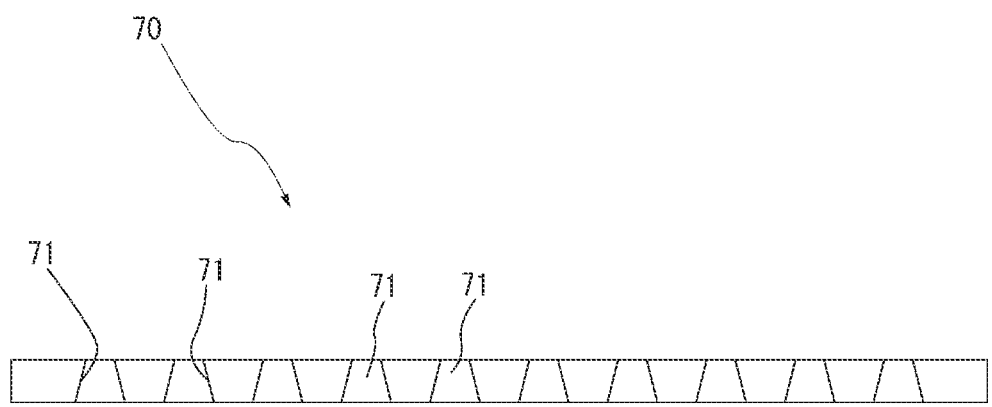

[FIG.10]
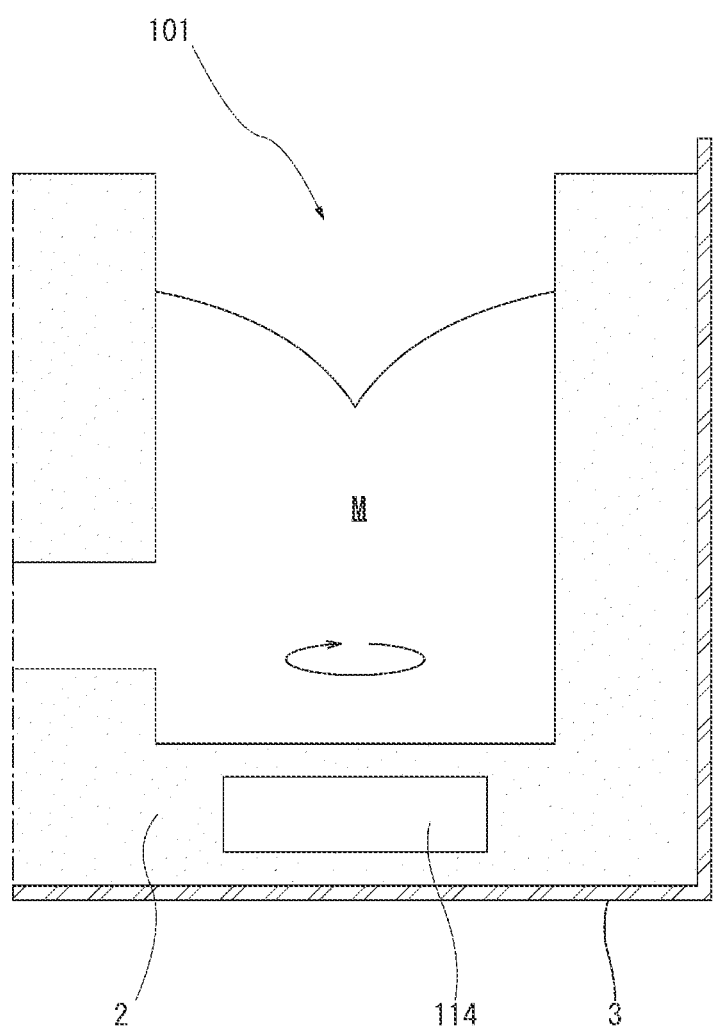

[FIG.11]
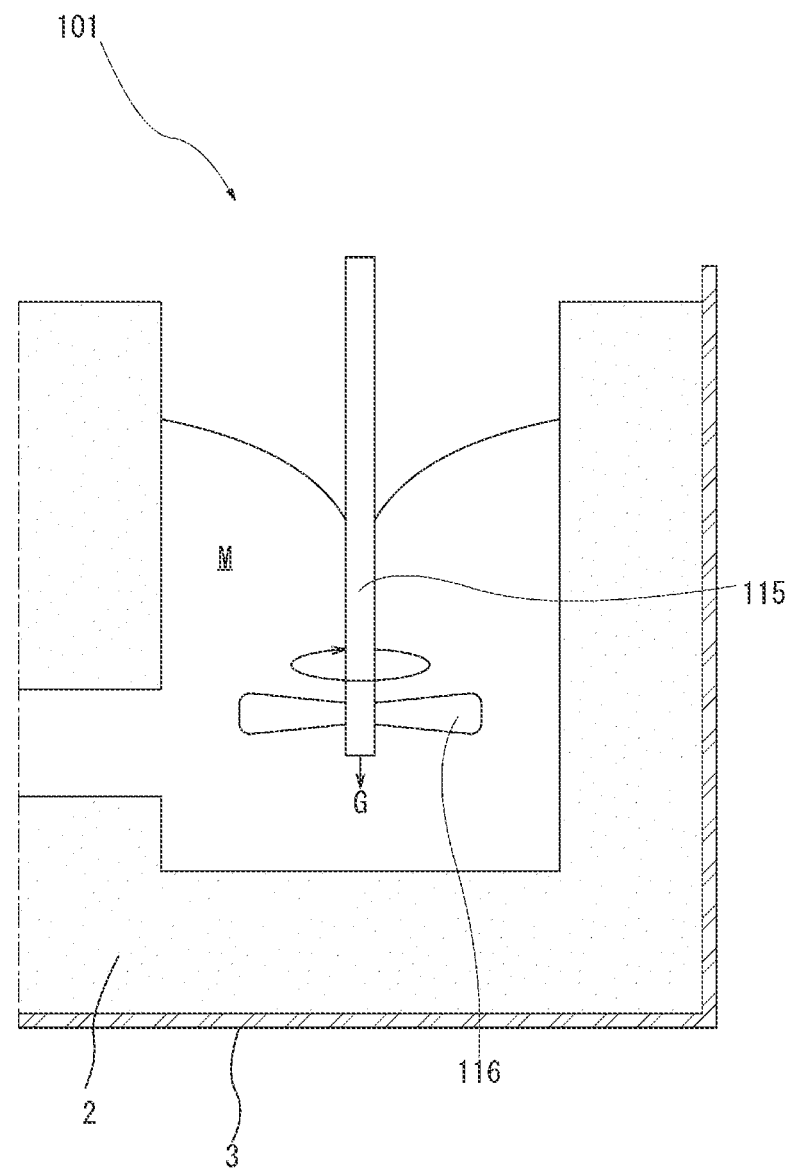

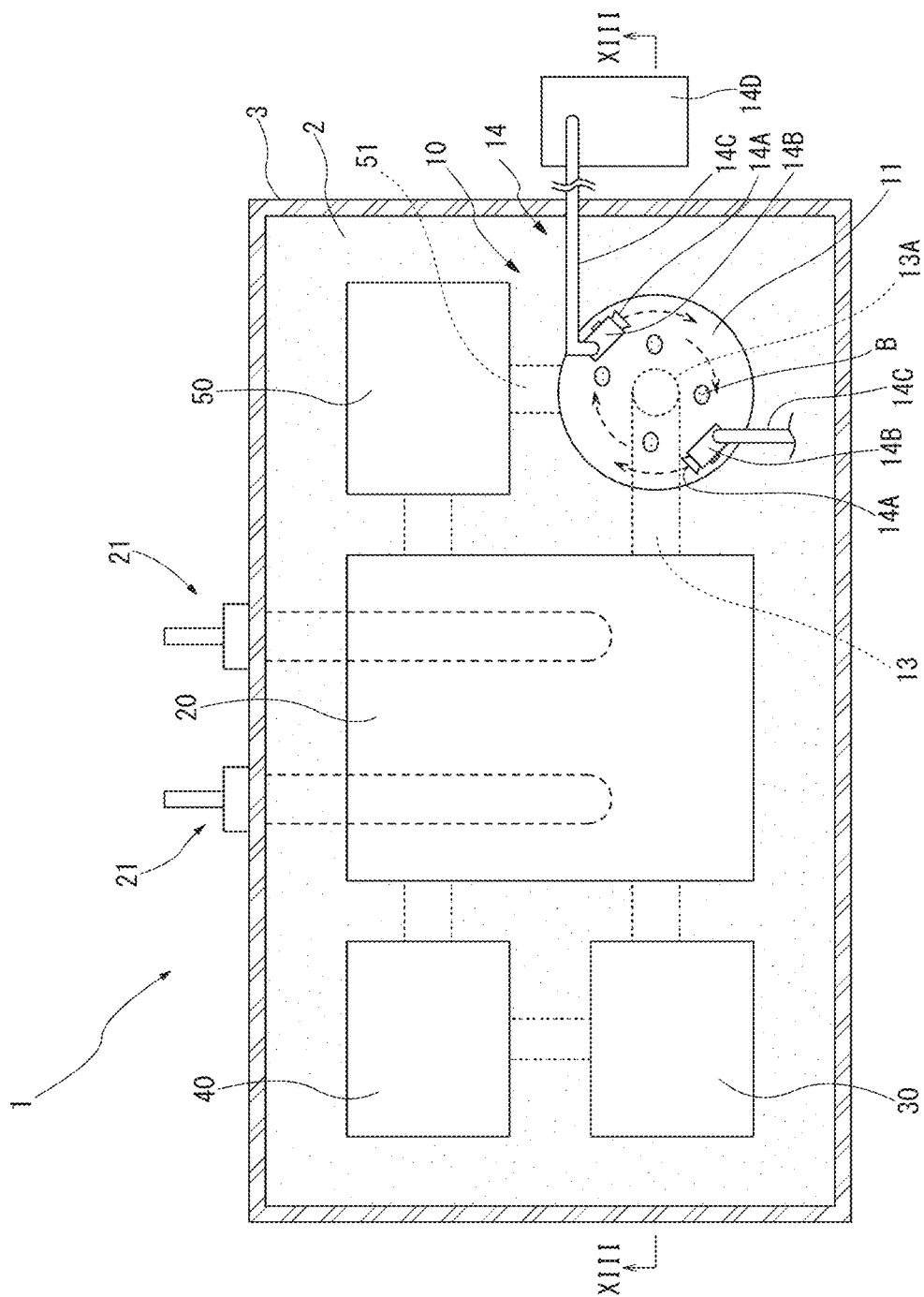
[FIG.12]

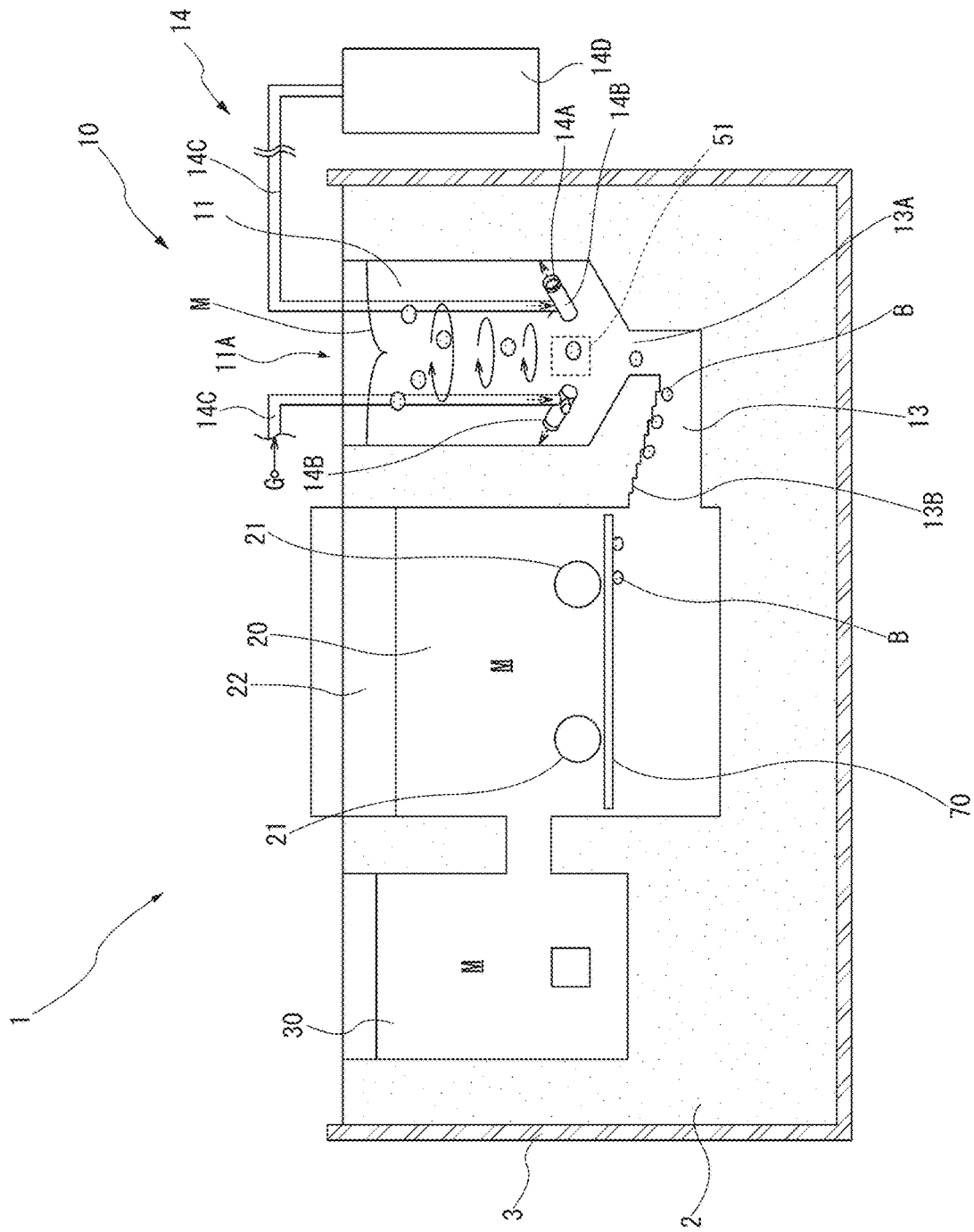
[FIG.13]

[FIG.14]
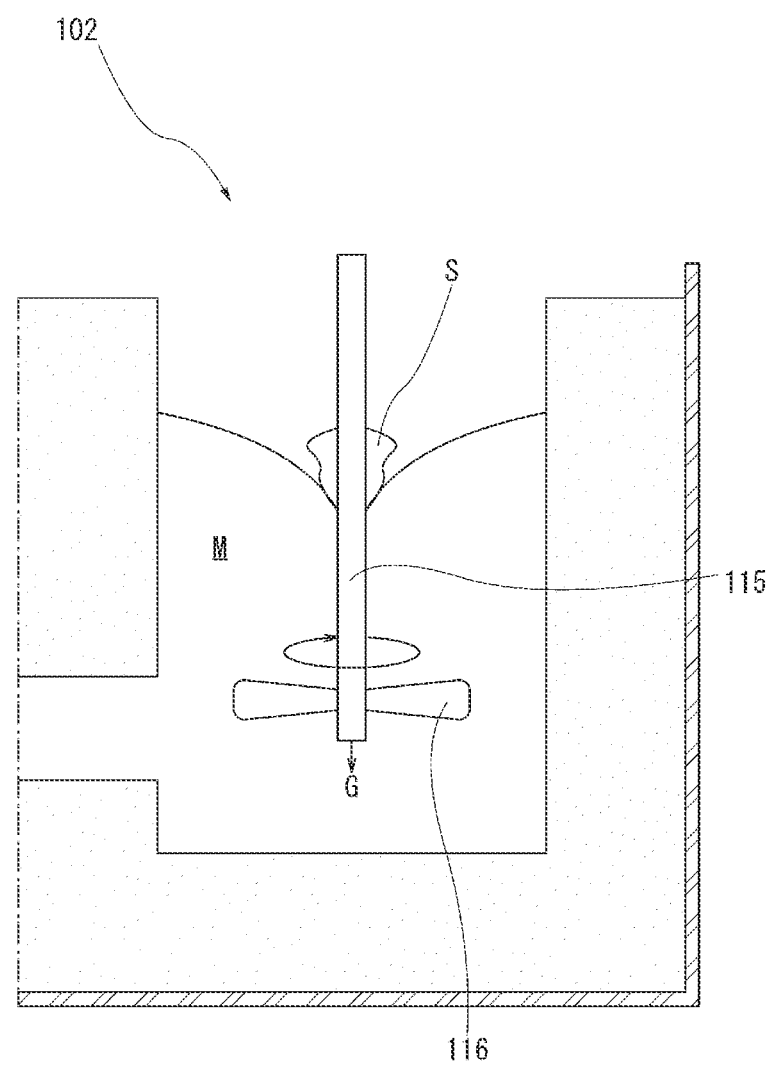

METAL MELTING APPARATUS, SCREEN PLATE FOR METAL MELTING, AND METHOD OF MELTING METAL

CROSS-REFERENCE TO RELATED APPLICATIONS

This application is the U.S. national stage application of International Application PCT/JP2020/041950, filed Nov. 10, 2020, which international application was published on May 20, 2021, as International Publication WO 2021/095731 in the Japanese language. The International Application claims priority of Japanese Patent Application Nos. 2019-207478, filed Nov. 15, 2019; 2019-207479, filed Nov. 15, 2019; and 2019-207480, filed Nov. 15, 2019. The international application and Japanese applications are all incorporated herein by reference, in entirety.

TECHNICAL FIELD

The present invention relates to metal melting apparatus wherein melt raw materials are molten by being supplied into melt, or the like manner, in particular, metal melting apparatus for melting melt raw materials, such as aluminum, aluminum alloys, non-ferrous metals, and the like, into melt to be supplied to casting apparatus, melting furnace, or the like, as well as a screen plate for metal melting used for melting the melt raw materials into melt, and a method of melting metal.

BACKGROUND ART

With growing concerns for environmental conservation, weight saving of machines and members composed of various cast products, such as engine blocks, has been promoted in the automobile industry and the like. In this regard, quantity of light weight, non-ferrous metal materials consumed, such as aluminum materials, aluminum alloy materials, or the like, is increasing.

In view of this, attempts are being made to reduce the amount of fresh material contained in the raw materials by using scrap material, such as return scrap, briquette material, and machined chips, as melt raw materials for melt for producing castings.

Among scrap materials, return scrap, which is an unnecessary portion generated during casting, has properties similar to those of fresh material and are thus convenient for melting with fresh material into melt.

On the other hand, among scrap materials, briquette material, in particular, which is made by compressing, into a solid, cutting wastes, machine chips, and the like, generated in processing and contains oil and water, cannot be made into melt of high quality, if supplied as it is into melt for melting, which results in burning of the oil to generate exhaust gas. Thus, briquette material may sometimes be pretreated in advance for evaporating oil and water contained therein, and are hard to be molten into melt in the manner similar to that for fresh material.

Further, briquette material, when compared with melt, has a lower specific gravity and a larger surface area, and thus easily floats on the melt surface and is prone to oxidization partly during melting. Similarly, machined chips also have a lower specific gravity and a larger surface area, and thus easily float on the melt surface and are prone to oxidization partly. For example, like $Al_2O_3$, which is an oxide of aluminum and has a melting point of 2072° C., oxides of non-ferrous metal materials, such as aluminum materials, like $Al_2O_3$, have extremely high melting points, so that the oxides like $Al_2O_3$, when formed in the melt, are not molten in the melt to remain as foreign matters, deteriorating the quality of the melt.

In this way, briquette material and machined chips are hard to be mixed and molten with fresh material or return scrap, and are thus mostly molten in a separate process.

On the other hand, techniques for discouraging formation of oxides during melting of briquette material or machined chips into melt, are disclosed in Patent Literatures 1 and 2 below.

According to the technique disclosed in Patent Literature 1, as schematically shown in FIG. 10, magnetic stirrer 114 is provided below melting chamber 101 to generate a vortex in melt M in the melting chamber, to thereby draw briquette material and machined chips, which have lower specific gravities compared with the melt M, into the melt M so as to reduce the duration of contact with external air, which discourages formation of oxides.

According to the technique disclosed in Patent Literature 2, flow of melt is generated all over the melting furnace by means of a magnetic generator, and a vortex is generated by the flow in a melting chamber, which constitutes part of the melting furnace, to thereby draw the machined chips or the like into the melt, as in Patent Literature 1.

Further, Patent Literature 1 also discloses to insert into melt an impeller capable of injecting inert gas through the tip end of its shaft to thereby stir the melt with the impeller while degassing. As schematically shown in FIG. 14, there is also proposed, like the degassing disclosed in Patent Literature 1, to insert into melt M an impeller 116 capable of injecting inert gas G through the tip end of its rotary shaft 115 to generate a vortex in a melting chamber 102 by means of the impeller 116, to thereby draw machined chips into the melt.

CITATION LIST

Patent Literature

Patent Literature 1: JP 2013-60629 A
Patent Literature 2: JP H02-219978 A

SUMMARY OF THE INVENTION

Problem to be Solved by the Invention

According to the prior art wherein the impeller inserted into the melting chamber is rotated to generate a vortex in the melting chamber, as shown in FIG. 14, oxide S may be formed and attached to the rotary shaft 115 near the melt surface, or the impeller 116 may be damaged upon introduction of briquette material. Further, in trying to mix and melt fresh material or return scrap in the melt, the fresh material or the return scrap, which has a higher specific gravity, will come into collision with the impeller, which further increases the possibility of damage of the impeller 116.

According to the technique wherein the magnetic stirrer 114 is disposed below the bottom of the melting chamber 101 to generate a vortex in the melting chamber, as shown in FIG. 10, the bottom of the melting chamber 101 per se is required to be constructed of a refractory material 2, and cannot be constructed of magnetic alloys, such as a steel shell, so that the magnetic stirrer 114 is required to be arranged close to and below the bottom of the melting chamber 101 via the refractory material 2. In this way, however, the outward temperature gradient below the bottom of the melting chamber 101 becomes different from that of the remaining portions, so that the risk of melt leakage through the boundaries between the magnetic stirrer 114 and the refractory material 112 or the like may be increased. Further, maintainability of the region below the bottom of the melting chamber 101, which is a reservoir of a high temperature melt M, is remarkably poor.

Further, by means of the vortex generated by the conventional methods discussed above, briquette material may sometimes be drawn into the melt without difficulty, but the briquette material thus drawn may sometimes be transferred to the subsequent step unmolten without being molten completely. In such a case, the unmolten briquette material may come up to the melt surface in the subsequent step, where it may be oxidized.

Therefore, a primary object of the present invention is to provide metal melting apparatus which solves the problems of the prior art discussed above, and by which a clear melt with little oxide may be obtained even when either one or a mixture of any combination of fresh material and scrap material, such as return scrap, briquette material, or machined chips, is supplied as a melt raw material; metal melting apparatus in which a melt raw material, like briquette material, having a lower specific gravity compared with the melt, is molten without being oxidized; a screen plate for metal melting with which a melt raw material, like briquette material, having a lower specific gravity compared with the melt, is molten without being oxidized; and a method of melting metal.

Means for Solving the Problem

Means for solving the above problems are as follows.
[First to Eighth Means]
The first means is metal melting apparatus comprising:
a melting chamber to which a melt raw material is supplied, and
a gas injection system for injecting gas into melt in the melting chamber to generate a vortex of the melt in the melting chamber.
The second means is the metal melting apparatus according to the first means, wherein the gas is an inert gas which is inactive to the melt.
The third means is the metal melting apparatus according to the first or second means, wherein the gas injection system comprises a plurality of gas injection ports to inject the gas at a plurality of locations in the melting chamber.
The fourth means is the metal melting apparatus according to any of the first to third means, wherein the gas is injected in an upward spiral direction along an interior wall surface of the melting chamber.
The fifth means is the metal melting apparatus according to any of the first to fourth means, wherein the melting chamber is in a part of a melt circulation channel, and wherein the melt circulated to the melting chamber is supplied to the melting chamber as a fluid for generating a vortex together with the gas injected.
The sixth means is the metal melting apparatus according to any of the first to fifth means, further comprising a supply line for supplying the melt from the melting chamber to a subsequent step, and impacting means provided in the supply line or in the melting chamber in the vicinity of the supply line, for making an impact on unmolten melt raw material that is flowing out of the melting chamber to the subsequent step.

The seventh means is the metal melting apparatus according to any of the first to sixth means, wherein the impacting means is an interior wall of the supply line or an interior wall of the melting chamber in the vicinity of the supply line, configured to cause the unmolten melt raw material to impinge thereon.

The eighth means is the metal melting apparatus according to any of the first to seventh means, wherein the melting chamber is provided with melt heating means for heating the melt.

[Effect of the Invention According to First to Eighth Means]

As the present metal melting apparatus according to the first to eighth means generates a vortex in the melting chamber, scrap material having a lower specific gravity, such as briquette material or machined chips, when supplied, is promptly drawn toward the bottom of the vortex center, so that the scrap material is hardly brought into contact with external air, and oxides are hardly formed.

Moreover, as a vortex is generated in the melt by means of the gas injection system, a stirring member, such as an impeller or a stirrer, is not present in the bottom portion of the vortex center. Accordingly, the possibility of contact between the melt raw materials and the stirring member is significantly reduced, so that either one or a mixture of any combination of fresh material and a plurality of types of scrap materials, such as return scrap, briquette material, or machined chips, may be supplied to the melting chamber for melting.

Further, as a vortex is generated by means of the gas injection system, dynamic parts may be reduced, unlike the stirring with an impeller or a stirrer, which leads to superior maintainability and handleability of the apparatus.

With the gas being an inert gas which is inactive to the melt, degassing effect is obtained, which provides a high quality clear melt.

By providing the gas injection system with a plurality of gas injection ports, flow may efficiently be generated in a melt with large mass to facilitate efficient generation of a vortex.

With the gas injected in an upward spiral direction along the interior wall surface of the melting chamber, efficient and continuous generation of a vortex is facilitated, which leads to easier drawing of the melt raw materials toward the bottom of the vortex center. Here, the efficiency may further be improved by making the melting chamber in the form of an approximate inverted cone or an approximate cylinder.

Further, by providing the melting chamber as, for example, a part of the melting furnace, and as a part of a melt circulation channel, and causing the melt circulated to the melting chamber to be supplied to the melting chamber as a fluid that generates a vortex together with the injected gas, a vortex is efficiently generated in the melting chamber.

Further, by providing the supply line for supplying the melt from the melting chamber to the subsequent step, and providing the impacting means in the supply line or in the melting chamber in the vicinity of the supply line, for making an impact on the unmolten melt raw materials that is flowing out of the melting chamber to the subsequent step, impacts may be made by the impacting member on the unmolten melt raw materials, like briquette material, which could not be molten in the supply line or the melting chamber, to cause breaking of the unmolten melt raw materials, which facilitates melting until it is supplied to the subsequent step.

By configuring the impacting means on the interior wall of the supply line or on the interior wall of the melting chamber in the vicinity of the supply line to cause the unmolten melt raw materials to impinge thereon, the unmolten melt raw materials may be given impacts easily without providing any dynamic parts.

Further, by providing the melting chamber with the melt heating means for heating the melt, the melt contained in the melting chamber is heated, which reduces temperature loss of the melt due to supply of the melt raw materials, facilitating prompt melting of the melt raw materials.

[Ninth to Fifteenth Means]

The ninth means is metal melting apparatus comprising:
a melting chamber wherein a melt raw material is supplied into a melt,
a heating chamber communicated with the melting chamber via a supply line and having heating means for heating the melt, and
a screen plate for metal melting disposed in the heating chamber for preventing surfacing of unmolten melt raw material transferred through the supply line, at least until the unmolten melt raw material reaches a predetermined size.

The tenth means is the metal melting apparatus according to the ninth means, wherein the screen plate for metal melting is provided with a multitude of through holes, each of the through holes being tapered from its bottom face side toward its top face side.

The eleventh means is the metal melting apparatus according to the ninth or tenth means, further comprising impacting means provided in the supply line or in the melting chamber in the vicinity of the supply line, for making an impact on the unmolten melt raw material that is being transferred from the melting chamber to the heating chamber.

The twelfth means is the metal melting apparatus according to any of the ninth to eleventh means, wherein the impacting means is an interior wall of the supply line or an interior wall of the melting chamber in the vicinity of the supply line, configured to cause the unmolten melt raw material to impinge thereon.

The thirteenth means is the metal melting apparatus according to any of the ninth to twelfth means, further comprising vortex generating means provided in the melting chamber for generating a vortex in the melt in the melting chamber.

The fourteen means is the metal melting apparatus according to the thirteenth means, wherein the vortex generating means generates a vortex in the melt by injecting gas into the melt.

The fifteenth means is the metal melting apparatus according to the fourteenth means, wherein the gas is an inert gas which is inactive to the melt.

[Effect of the Invention According to Ninth to Fifteenth Means]

According to the present invention, in melting a melt raw material having a lower specific gravity compared with the melt, like briquette material, which is a scrap material of, for example, aluminum alloys or non-ferrous metal materials, the melt raw material is kept from coming up to the melt surface by means of the screen plate for metal melting disposed in the heating chamber, so that oxidation of the melt raw material due to contact with the air and the like on the melt surface may be avoided and accordingly, clear melt with little oxides may be obtained. Further, with the improvement in the yield from the melt in refining, slag processing for disposal of oxides may be reduced.

By providing the screen plate for metal melting with a multitude of through holes, and tapering each through hole from the bottom face side toward the top face side, the melt raw materials are stuck in the through holes and held therein until they reach a predetermined size, specifically, a size sufficient for melting before coming up to the melt surface, so as to melt successfully without surfacing and without being oxidized.

By providing the impacting means in the supply line or in the melting chamber in the vicinity of the supply line, for making an impact on the unmolten melt raw materials that are being transferred to the heating chamber, impacts are given on the unmolten melt raw materials by the impacting means to break them, which facilitates melting of the unmolten melt raw materials until they are supplied to the heating chamber. In particular, materials, like briquette material, made by compressing cutting wastes or machined chips into a solid, are easily disintegrated by the impacts, which promotes melting particularly efficiently.

Further, by providing this impacting means as the supply line or the like configured to cause the unmolten melt raw materials to impinge thereon, impacts may be given on the unmolten melt raw materials easily without providing any dynamic parts.

By providing the melting chamber with the vortex generating means for generating a vortex in the melt in the melting chamber, scrap material having a lower specific gravity, like briquette material, when supplied, may promptly be drawn toward the bottom of the vortex center, so that the scrap material is hardly brought into contact with external air and oxides are hardly formed, resulting in an even clearer melt.

Further, by causing the vortex generating means to generate a vortex in the melt by injecting gas into the melt, a stirring member, such as an impeller or a stirrer, may be eliminated from the bottom portion of the vortex center. Accordingly, the possibility of contact between the melt raw materials and the stirring member is significantly reduced, so that not only melt raw materials which have a lower specific gravity compared with the melt, such as briquette material or machined chips, but also melt raw materials which sink in the melt, such as return scrap or fresh material, may be combined and supplied to the melting chamber for melting. As the number of dynamic parts, such as an impeller or a stirrer, may be reduced, maintainability and handleability may be improved.

Further, with the gas being an inert gas which is inactive to the melt, degassing effect is obtained, which provides a clearer melt of still higher quality.

[Sixteenth to Twenty-Third Means]

The sixteenth means is a screen plate for metal melting, which is in a form of a plate having a multitude of through holes, and which is to be disposed in a melt for holding a melt raw material that has been supplied into the melt and has a lower specific gravity compared with the melt, so as to prevent surfacing until the melt raw material reaches a predetermined size.

The seventeenth means is the screen plate for metal melting according to the sixteenth means, wherein the screen plate for metal melting is adapted to be disposed in a heating chamber of metal melting apparatus including a melting chamber in which a melt raw material is supplied into a melt, and the heating chamber communicated with the melting chamber via a supply line and having heating means for heating the melt, so as to separate a heating-chamber-side opening of the supply line from space above the opening.

The eighteenth means is the screen plate for metal melting according to the sixteenth or seventeenth means, wherein each of the through holes is tapered from its bottom face side toward its top face side.

The nineteenth means is a method of melting metal comprising:

disposing, in a melt, a screen plate for metal melting in a form of a plate having a multitude of through holes so that a melt raw material having a lower specific gravity compared with the melt is supplied on a bottom side of the screen plate for metal melting disposed in the melt, and holding the melt raw material in the melt so as not to come up to a melt surface until the melt raw material reaches a size to pass through the through holes.

The twentieth means is the method of melting metal according to the nineteenth means, wherein the screen plate for metal melting is disposed in a heating chamber of metal melting apparatus including a melting chamber wherein a melt raw material is supplied into the melt, and the heating chamber communicated with the melting chamber via a supply line and having heating means for heating the melt, so as to separate a heating-chamber-side opening of the supply line from space above the opening, and holding in the melt the melt raw material transferred through the supply line into the heating chamber so as not to come up to a melt surface until the melt raw material reaches a size to pass through the through holes.

The twenty-first means is the method of melting metal according to the twentieth means, further comprising:

generating a vortex in the melt contained in the melting chamber to draw, by the vortex, the melt raw material supplied to the melting chamber into the supply line for transfer to the heating chamber.

The twenty-second means is the method of melting metal according to the twenty-first means, wherein the vortex is generated in the melt by injecting gas into the melt.

The twenty-third means is the method of melting metal according to the twenty-second means, wherein the gas is an inert gas which is inactive to the melt.

[Effect of the Invention According to Sixteenth to Twenty-Third Means]

According to the screen plate for metal melting and the method of melting metal according to the present invention, in melting melt raw materials having a lower specific gravity compared with the melt, like briquette material, which is a scrap material of, for example, aluminum alloys or non-ferrous metal materials, surfacing of the melt raw materials may be prevented by supplying the melt raw materials to below the screen plate for metal melting, so that oxidation of the melt raw materials due to contact with the air and the like on the melt surface may be avoided and accordingly, clear melt with little oxides may be obtained. Further, with the improvement in the yield from the melt in refining, slag processing for disposal of oxides may be reduced.

Further, by tapering, from its bottom face side toward its top face side, each of the through holes provided in the screen plate for metal melting, the melt raw materials are stuck in the through holes and held therein until they reach a predetermined size, specifically, a size sufficient for melting before coming up to the melt surface, so as to melt successfully without surfacing and without being oxidized.

By disposing the screen plate for metal melting in the heating chamber of the metal melting apparatus including a melting chamber wherein melt raw materials are supplied into the melt, and the heating chamber communicated with the melting chamber via a supply line and having heating means for heating the melt, so as to separate the heating-chamber-side opening of the supply line from space above the opening to melt the melt raw materials, surfacing of the melt raw materials in the heating chamber having the heating means is prevented and the melt raw materials are efficiently molten in the absence of oxygen.

By generating a vortex in the melt contained in the melting chamber of the metal melting apparatus which includes the melting chamber and the heating chamber wherein the screen plate for metal melting is disposed in this way, scrap material having a lower specific gravity, like briquette material, when supplied, is promptly drawn toward the bottom of the vortex center, so that the scrap material is hardly brought into contact with external air, and oxides are hardly formed, resulting in even clearer melt.

Further, by generating the vortex in the melt with the gas injected into the melt, a stirring member, such as an impeller or a stirrer, may be eliminated from the bottom of the vortex center. Accordingly, the possibility of contact between the melt raw materials and the stirring member is significantly reduced, so that not only melt raw materials which have a lower specific gravity compared with the melt, such as briquette material or machined chips, but also melt raw materials which sink in the melt, such as return scrap or fresh material, may be combined and supplied to the melting chamber for melting. As the number of dynamic parts, such as an impeller or a stirrer, may be reduced, maintainability and handleability may be improved.

By using, as the gas, an inert gas which is inactive to the melt, degassing effect is obtained, which provides a clearer melt of still higher quality.

Effect of the Invention

According to the present invention, there are provided metal melting apparatus by which a clear melt with little oxides may be obtained even when either one or a mixture of any combination of fresh material and scrap material, such as return scrap, briquette material, or machined chips, is supplied as a melt raw material; metal melting apparatus in which a melt raw material, like briquette material, having a lower specific gravity compared with the melt, is molten without being oxidized; a screen plate for metal melting with which a melt raw material, like briquette material, having a lower specific gravity compared with the melt, is molten without being oxidized; and a method of melting metal.

BRIEF DESCRIPTION OF THE DRAWINGS

FIG. 1 is a schematic plan view of a melting/holding furnace including metal melting apparatus according to the present invention.

FIG. 2 is a schematic sectional view of the melting/holding furnace including the metal melting apparatus according to the present invention, taken along lines II-II in FIG. 1, provided that members that do not appear in the view taken along lines II-II, and the like, are also illustrated for the sake of convenience in explanation.

FIG. 3 is a schematic plan view of a melting/holding furnace including another metal melting apparatus according to the present invention.

FIG. 4 is a schematic sectional view of the melting/holding furnace including the another metal melting apparatus according to the present invention, taken along lines IV-IV in FIG. 3, provided that members that do not appear in the view taken along lines IV-IV, and the like, are also illustrated for the sake of convenience in explanation.

FIG. 5 is a sectional view for explanation of a jet pump according to the present invention.

FIG. 6 is a perspective view for explanation of a screen plate for metal melting according to the present embodiment.

FIG. 7 is a sectional view of the screen plate for metal melting according to the present embodiment, taken along lines VI-VI.

FIG. 8 is a perspective view for explanation of another screen plate for metal melting according to the present embodiment.

FIG. 9 is a sectional view of the other screen plate for metal melting according to the present embodiment, taken along lines VIII-VIII.

FIG. 10 is a sectional view of an example of metal melting apparatus.

FIG. 11 is a sectional view of an example of another metal melting apparatus.

FIG. 12 is a schematic plan view of a melting/holding furnace including another metal melting apparatus according to the present invention.

FIG. 13 is a schematic sectional view of the melting/holding furnace including the another metal melting apparatus according to the present invention, taken along lines XIII-XIII in FIG. 12, provided that members that do not appear in the view taken along lines XIII-XIII, and the like, are also illustrated for the sake of convenience in explanation.

FIG. 14 is a sectional view of an example of conventional metal melting apparatus.

DESCRIPTION OF EMBODIMENTS

Embodiments of the present invention will now be discussed below with reference to FIGS. 1 to 13.

Metal melting apparatus 10 according to the present embodiment is preferably incorporated into melting/holding furnace 1, which includes melting chamber 11 wherein melt raw material B is supplied into melt M and molten, heating chamber 20 communicated with the melting chamber 11 via supply line 13 and heating the melt M therein, sedimentation chamber 30 for holding the melt M therein for precipitating impurities or the like in the melt M, and drawing chamber 40 for drawing out and pouring the melt M into external casting apparatus, another melting/holding furnace, another holding furnace, or the like. The melting/holding furnace 1 having the metal melting apparatus 10 incorporated therein is also provided as a present invention.

Further, screen plate 70 for metal melting according to the present embodiment is preferably disposed in the metal melting apparatus 10, which includes the melting chamber 11 wherein the melt raw material B is supplied into melt M, and the heating chamber 20 communicated with the melting chamber 11 via the supply line 13 and heating the melt M therein. While the metal melting apparatus 10 and the melting/holding furnace 1 are discussed below, embodiments of the screen plate 70 for metal melting and the method of melting metal will be discussed.

Note that the metal melting apparatus 10 according to the present invention is not limited to the embodiment which is incorporated into the melting/holding furnace according to the present embodiment, and may be implemented as apparatus wherein the melt raw material B is supplied into the melt M for melting, alone or incorporated into other types of melting/holding furnaces or melting furnaces.

In the melting/holding furnace 1 according to the present embodiment, each chamber is formed of refractory material 2 in outer shell 3, and the melting chamber 11 is communicated with the heating chamber 20 via the supply line 13. Further, circulation chamber 50 communicated with the heating chamber 20 and with the melting chamber 11 is preferably provided, so that the melt M may be circulated from the heating chamber 20 via the circulation chamber 50 to the melting chamber 11.

In the heating chamber 20, as shown in FIGS. 1 to 4, immersion heaters 21, 21 are preferably arranged inserted from above for heating the melt M. In this way, the melt M is held and retained in the melting/holding furnace 1. By heating the melt M with the immersion heaters 21, 21, the temperature of the melt M in the melting/holding furnace 1 is maintained, and the melt raw material B supplied to the melting chamber 11 and the melt raw material B transferred from the melting chamber 11 via the supply line 13 to the heating chamber 20 are molten in the melt M. Note that the heating means for heating the melt M provided in the heating chamber 20 is not limited to the immersion heaters 21, 21, and immersion burners may be used. Further, the arrangement of the immersion heaters 21, 21 is not limited to the insertion from above into the heating chamber 20, and the immersion heaters 21, 21 may be inserted into the heating chamber 20 through the side walls of the heating chamber 20 as shown in FIGS. 12 and 13, or may be disposed on the bottom. In the melting/holding furnace 1 according to the present embodiment, the melt M is heated in the heating chamber 20, and circulated into the melting chamber 11 via the circulation chamber 50, so that the temperature of the melt M in the melting chamber 11 is hard to be lowered. That is, the temperature upon supply of the melt raw material B is hard to be lowered, which facilitates melting of the melt raw material B.

The melting chamber 11 has supply port 11A in its upper portion for supplying the melt raw material B. Through this supply port 11A, the melt raw material B, which may be aluminum, aluminum alloys, or other non-ferrous metal materials, is supplied into the melt M in the melting chamber 11 via a carrying-in device, such as a hopper or a conveyer (not shown). Examples of the other non-ferrous metal materials may include magnesium and magnesium alloys. Further, examples of the specific form of the aluminum, aluminum alloys, and other non-ferrous metal materials may include scrap material, such as return scrap, briquette material, or machined chips, or fresh material. The metal melting apparatus 10 according to the present invention is particularly suitable for melt raw material B, like briquette material, which has a lower specific gravity compared with the melt M and floats on the melt surface. Melt raw material B, like briquette material, which contains oil, water, or the like, may be subjected to a pretreatment for removing the oil, water, and the like, by drying or preheating in advance.

On the other hand, the metal melting apparatus 10 according to the present invention is preferably provided in the melting chamber 11 with vortex generating means for generating a vortex in the melt M in the melting chamber 11. In the method of melting metal according to the present invention, it is preferred to generate a vortex in the melt M in the melting chamber 11.

The vortex generating means may preferably be gas injection system 14 which generates a vortex in the melting chamber 11 for stirring the melt raw material B together with the melt M by injecting gas G into the melt M, as in the embodiments shown in FIGS. 1 to 4 and FIGS. 12 to 13. For the purpose of obtaining the effect of installation of the screen plate for metal melting, magnetic stirrer 114 may be provided below melting chamber 101 as shown in FIG. 10 to generate a vortex in melt M in the melting chamber 101. Further, a stirring device having impeller 116 provided at the end of its rotary shaft 115 may be inserted into melt M in the melting chamber 101 or circulation chamber 50 as shown in FIG. 11, to stir the melt M with the impeller 116 to thereby generate a vortex. In this embodiment, inert gas G which is inactive to the melt M may be injected through the tip end of the rotary shaft 115 for degassing. By generating a vortex in the melt M in the melting chamber 101 as in these embodiments, even when melt raw material B having a lower specific gravity compared with the melt M is supplied, such melt raw material B is promptly drawn toward the bottom of the vortex center, so that the melt raw material B is hardly brought into contact with external air and oxides are more hardly formed, resulting in an even clearer melt M. In addition, collision among the melt raw material B, while being stirred in the vortex, is induced to cause disintegration of the melt raw material B, which facilitates melting. In particular, briquette material made by compressing cutting wastes or machined chips into a solid, is efficiently disintegrated.

In the case where, in particular, a vortex is to be generated, melting-chamber-side opening 13A of the supply line 13 connecting the melting chamber 11 and the heating chamber 20 is preferably formed in the center of the bottom of the melting chamber 11, where the bottom of the vortex center is to be located, as shown, for example, in FIGS. 2, 4, and 13. This arrangement causes the melt raw material B to be drawn by the vortex toward the bottom of the vortex center and supplied to the heating chamber 20 without surfacing, resulting in efficient melting of the melt raw material B.

As a particularly preferred form of the vortex generating means provided in the melting chamber 11 according to the present embodiment, a specific form for generating a vortex in the melt M by injection of gas G into the melt will now be discussed in more detail. The melting chamber 11 in the present embodiment is, as discussed above and as shown in FIGS. 1 to 4 and FIGS. 12 to 13, characteristically provided with the gas injection system 14 which injects gas G into the melt M in the melting chamber 11 to generate a vortex in the melting chamber 11 for stirring the melt raw material B together with the melt M, and constitutes the metal melting apparatus 10 together with the heating chamber 20.

The gas injection system 14 may be composed of, for example, injecting parts 14B each having an injection port 14A positioned in the melt M, air line 14C communicated with each injecting part 14B, and gas generating device 14D for generating gas G, as shown in FIGS. 1 to 4 and FIGS. 12 to 13. For example, when the gas is nitrogen gas, the gas generating device may be a nitrogen gas generator ($N_2$ Pack) manufactured by HITACHI INDUSTRIAL EQUIPMENT SYSTEMS CO., LTD., or equivalents thereof manufactured by ANEST IWATA CORPORATION or other companies. Gas G supplied from the gas generating device 14D through the air lines 14C into the melting chamber 11 is injected through the injection ports 14A into the melt M to stir the melt M in the melting chamber 11 and generate a vortex.

The melting chamber 11 may be in the form of a rectangular box, but where a vortex is to be generated, it is preferred that the interior space for retaining the melt M therein is in the form of an approximate cylinder or an approximate inverted cone, as particularly shown in FIGS. 1 to 4 and FIGS. 12 to 13. The melt M flows guided along the interior wall surface to induce generation and maintenance of a vortex of the melt M in the melting chamber 11. In this way, energy involved in the gas injection may be reduced.

Though not shown, a current plate may be provided for guiding, in an appropriate direction, the gas G injected through the injection ports 14A into the melting chamber 11, and facilitating generation of a vortex. For example, a current plate projecting from the interior wall of the melting chamber 11 toward the center may be provided immediately above an injection port 14A. This prevents the gas G injected through the injection port 14A from rising immediately as bubbles, to thereby facilitate generation of a vortex. Here, by tilting the current plate slightly upwards as it is away from the injection port 14A, the gas G is injected in an approximate spiral direction to further promote generation of a vortex. Further, the interior wall of the melting chamber 11 may be provided with an interior surface guide, which may preferably be in the form of, for example, a spiral groove. In this way, generation of a vortex is promoted.

The melting chamber 11 is preferably provided with melt heating means for heating the melt M. Though not shown, the melt heating means may be an immersion heater disposed on the bottom of or in the vicinity of a side wall of the melting chamber 11. The immersion heater may also be arranged inserted from above into the melt M in the vicinity of a side wall of the melting chamber 11. With the melting chamber 11 provided with the melt heating means, the melt M contained in the melting chamber 11 is heated to reduce temperature loss of the melt M due to supply of the melt raw material B, facilitating more prompt melting of the melt raw material B. The immersion heater may be replaced with an immersion burner.

The gas injection system 14 in the present embodiment preferably has the injecting parts 14B arranged in the melting chamber 11 in the vicinity of its interior wall surface as in the embodiments shown in FIGS. 1 and 2 and FIGS. 12 and 13. The supplied melt raw material B is drawn by the vortex toward the vortex center. With the injecting parts 14B arranged in the vicinity of the interior wall surface, the melt raw material B is hardly brought into contact with the injecting parts 14B, reducing the possibility of damage of the gas injection system 14.

Alternatively, the gas injection system 14, for further reducing the possibility of contact with the melt raw material B, may be disposed in a side wall of the melting chamber 11, with each injection port 14A in the wall surface, facing toward the inside of the melting chamber 11 as in the embodiment shown in FIGS. 3 and 4. In the embodiment shown in FIGS. 3 and 4, the melting chamber 11 is a part of the melting/holding furnace 1, which is provided with circulation chamber 50 and a circulation line for circulating the melt M from the heating chamber 20 to the melting chamber 11, and an injecting part 14B is provided, with its injection port 14A facing inside the melting chamber 11, between the walls between the melting chamber 11 and the circulation chamber 50, i.e., in a circulation line for circulating the melt M from the heating chamber 20 to the melting chamber 11, such as communicating line 51 between the melting chamber 11 and the circulation chamber 50. In this way, the injecting parts 14B are not located in the melting chamber 11, so that the contact between the injecting parts 14B and the melt raw material B is effectively prevented, and the possibility of damage of the gas injection system is remarkably reduced.

The orientation of the injection port 14A for gas G, that is, the direction of the gas injection, may be set so that the center of a vortex to be generated is located in the center portion of the melting chamber 11 as shown in FIGS. 1 to 4 and FIGS. 12 and 13. For example, in the case of a melting chamber 11 of an approximate circular shape as seen in a plan view as illustrated in the figures, the orientation of the injection port 14A may be in approximately a tangential direction to that circle.

Further, as shown in FIGS. 2 and 13, by locating each injecting part 14B in the melting chamber 11 at a depth close to the bottom, with its injection port 14A facing slightly upward so that the gas G injected through the injection port 14A is injected from the lateral side of the bottom of the melting chamber 11 in a spiral direction with respect to the central portion of the melting chamber 11, generation of a vortex in the melting chamber 11 is further facilitated. Incidentally, in the illustrated embodiment, the direction of injection of gas G is set so that the vortex center is positioned in the central portion of the melting chamber 11 but, of course, when the vortex center is set at a location other than the central portion of the melting chamber 11, the injection ports 14A and the injecting parts 14B may suitably be arranged so that the gas G is injected spirally with respect to the center of such vortex.

It is preferred that the gas G is injected in the melting chamber 11 at a plurality of locations. In the illustrated embodiments, the gas G is injected at two locations. For providing a plurality of injecting locations, the melting chamber 11 may be provided with one gas injection system 14 having a plurality of injection ports 14A, or with a plurality of gas injection systems 14. By injecting the gas G at a plurality of locations, a larger stirring force for the melt M may be generated, which facilitates generation of a vortex. In this case, by arranging the injection ports 14A at locations symmetrical with respect to a point, which may be the central portion of a vortex to be generated, for example, the center of the melting chamber 11, generation of a vortex is further promoted. When a plurality of injecting locations is employed, the injecting locations may be arranged at various depth positions, which facilitates generation of a vortex. In a melting chamber 11 with a common depth, preferably one of the injecting locations may be at 350 to 400 mm, while the other of the injecting locations may be at 170 to 230 mm.

The gas injection system 14 is not limited as long as it injects gas G into the melt M to fluidize the melt M and to generate a vortex therein, and preferably the structure of jet pump 16 shown schematically in section in FIG. 5, may be employed. Taking advantage of the phenomenon wherein, by pumping into nozzle 17 and injecting therethrough the high-pressure driving fluid G at a high velocity toward throat 18, the pressure of the resulting jet becomes negative, the jet pump 16 draws the driven fluid M around the jet to inject the driven fluid M while mixing the same with the jet. That is, with the jet pump 16, by injecting the gas G as the driving fluid, the melt M therearound may be sucked in or entangled as the driven fluid and injected together with the gas G, so that fluidization of the melt M is significantly facilitated, compared to the fluidization of the melt M in the melting chamber 11 only with the gas G, and generation of a vortex is facilitated.

It is particularly preferred to arrange the injecting parts 14B between the walls between the melting chamber 11 and the circulation chamber 50, i.e., in the communicating line 51 between the melting chamber 11 and the circulation chamber 50 or the like, and to adopt the structure of the jet pump 16 as in the embodiment shown in FIGS. 3 and 4, so that the melt M in the vicinity of the communicating line 51 flows, together with the gas G, into the melting chamber 11 to efficiently generate a vortex, while contact between the melt raw material B and the injecting parts 14B, which are parts of the gas injection system 14, is eliminated. Further, flow of the melt M circulating from the heating chamber 20 to the melting chamber 11 is generated, so that unmolten melt raw material B among the melt raw material B supplied to the melting chamber 11 does not stay in the melting chamber 11 but is supplied to the heating chamber 20, which efficiently promotes melting of the melt raw material B.

The gas G to be injected into the melt M may preferably be an inert gas which is inactive to the melt M (referred to as "the inactive gas" hereinbelow), such as nitrogen gas or argon gas. The inactive gas is not limited in its preparation or manner of supplying. The inactive gas may be supplied by transferring under pressure from a compressor which separates nitrogen gas from air, or a gas cylinder in which inert gas is sealed. The inactive gas may be injected preferably at 0.5 MPa or lower, more preferably at 0.3 to 0.5 MPa. By blowing the inactive gas G into the melt M, degassing effect is obtained while a vortex is generated, to thereby make the melt M clear. In particular, a strong degassing effect may be obtained by the increased contact between the melt M and the inactive gas G due to the generation of a vortex. With such a structure, a separate degassing chamber may be eliminated from the melting/holding furnace 1, resulting in a more compact overall furnace.

In the metal melting apparatus 10 according to the embodiments shown in FIGS. 1 to 4 and FIGS. 12 to 13, as a vortex of the melt M is generated in the melting chamber 11 by the gas injection, among the melt raw material B introduced through the supply port 11A formed in the upper part of the melting chamber 11, melt raw material B which is light in weight like briquette material or which has a lower specific gravity compared with the melt M and thus floats on the melt M, is drawn toward the bottom of the vortex center. On the other hand, melt raw material B which is with mass and has a higher specific gravity compared with the melt M sinks toward the bottom while being entangled in the vortex or with the flow of the vortex. In the melting chamber 11 according to these embodiments, a vortex is generated not by dynamic mechanical system parts like an impeller, but with gas G, so that neither melt raw material B which has a lower specific gravity or melt raw material B which sinks in the melt M is bought into contact with mechanical system parts, and the both may be supplied to the melting chamber 11.

The melt raw material B may be scrap material, such as return scrap, briquette material, and machined chips, or fresh material and, among these, briquette material and machined chips are prone to float on the melt M, whereas return scrap and fresh material are prone to sink in the melt M. Thus, in the metal melting apparatus 10 according to the embodiments shown in FIGS. 1 to 4 and FIGS. 12 to 13, briquette material and machined chips are prone to be drawn promptly by the vortex toward its bottom and transferred to the heating chamber 20, with a shorter time of contact with air and with oxides hardly formed, resulting in clear melt M. On the other hand, fresh material and return scrap, while they sink in the melt M, are exposed to the vortex and the melting proceeds. Thus, in the metal melting apparatus 10 according to this embodiment, wherein a vortex is generated in the melting chamber 11 by the injection of gas G, any combination of fresh material and scrap material, such as return scrap, briquette material, and machine chips, may be supplied to the melting chamber 11, which is advantageous. Note that, in this metal melting apparatus 10, for example, the gas injection may be suspended when only melt raw material B which sinks in the melt M, such as fresh material or return scrap, is to be molten, whereas the gas injection may be performed to generate a vortex only when melt raw material B which hardly sinks in the melt M, such as machined chips or briquette material, is supplied.

Further, collision among the melt raw material B, while being stirred in a vortex, is induced to cause disintegration of the melt raw material B, which facilitates melting. In particular, briquette material made by compressing cutting wastes or machined chips into a solid, is efficiently disintegrated.

Note that, in the metal melting apparatus 10 according to the present invention, for example, the gas injection may be suspended when only melt raw material B which sinks in the melt M, such as fresh material or return scrap, is to be molten, whereas the gas injection may be performed to generate a vortex only when melt raw material B which hardly sinks in the melt M, such as machined chips or briquette material, is supplied. Further, melt raw material B, like briquette material, which contains oil, water, or the like, may be subjected to a pretreatment for removing the oil, water, and the like, by drying or preheating in advance.

On the other hand, also in the metal melting apparatus 10 according to this embodiment, wherein a vortex is generated by gas injection, when supply line 13 is provided and configured to continuously supply the melt M to a subsequent step, such as heating chamber 20 as in the embodiment wherein the metal melting apparatus 10 is incorporated into the melting/holding furnace 1 according to the present embodiment, melting-chamber-side opening 13A of the supply line 13 supplying the melt M from the melting chamber 11 to a subsequent step may preferably be formed in the bottom of the vortex center, for example, in the center of the bottom of the melting chamber 11. This arrangement causes, as discussed above, the melt raw material B, such as machined chips or briquette material, to be drawn by the vortex toward the bottom of the vortex center and supplied to the subsequent step, the heating chamber 20, without floating of the unmolten melt raw material B, resulting in efficient melting of the melt raw material B.

When the metal melting apparatus 10 according to the present embodiment is provided with the supply line 13 as discussed above, it is preferred to provide impacting means in the supply line 13 or in the melting chamber 11 in the vicinity of the supply line 13, for making an impact on unmolten melt raw material B that is being transferred from the melting chamber 11. The impacting means may be those making an impact dynamically but, in view of maintainability, may preferably be static means, such as an obstacle, upon which unmolten melt raw material B impinges while it is transferred to the heating chamber 20 with the flow of the melt M. For example, the interior wall of the supply line 13 or the interior wall of the melting chamber 11 in the vicinity of the supply line 13 may be provided with irregularities upon which unmolten melt raw material B impinges as it passes. More specifically, unmolten melt raw material B, like briquette material, having a lower specific gravity compared with the melt M, is transferred by the buoyancy and the flow of the melt M toward the heating chamber 20, along the upper wall surface 13B of the supply line 13. Thus, by forming the upper wall surface 13B of the supply line 13 in a staircase pattern as shown in FIGS. 2, 4, and 13, or by providing the upper wall surface 13B with irregularities, unmolten melt raw material B, as it is transferred to the heating chamber 20, impinges upon the staircase-patterned upper wall surface 13B of the supply line 13 or upon the irregularities formed on the upper wall surface 13B and is subjected to impacts, so that the unmolten melt raw material B is disintegrated and is easily and promptly molten in the heating chamber 20 in which the screen plate 70 for metal melting is disposed.

In the melting/holding furnace 1 according to the present embodiment, a preferred embodiment of the heating chamber 20 communicated with the melting chamber via the supply line 13, is provided with heating chamber lid 22 which is disposed occluding the top opening of the heating chamber 20 so as not to leave a space from the surface of the melt M as shown in FIGS. 2, 4, and 13, which facilitates melting, in the absence of oxygen, of the melt raw material B transferred from the melting chamber 11. Note that the heating chamber 20 according to the present invention is not necessarily provided with such heating chamber lid 22 which eliminates a space from the surface of the melt M.

Further, in the melting/holding furnace 1 according to the present embodiment, the supply line 13 extending from the melting chamber 11 to the subsequent step, heating chamber 20, preferably has its outlet located in the lower part of the heating chamber 20 as shown in FIGS. 2, 4, and 13. With the outlet of the supply line 13 located in the lower part of the heating chamber 20, for example, melt raw material B having a lower specific gravity compared with the melt, like unmolten briquette material not completely molten in the melting chamber 11, when supplied to the heating chamber 20, may be molten while it comes up through the melt M in the heating chamber 20, which hardly allows the unmolten briquette material to reside in the upper part of the heating chamber 20 and be oxidized. Even when the heating chamber lid 22 is disposed occluding the top opening of the heating chamber 20 so as not to leave a space from the surface of the melt M, gas, such as air, could sometimes be present between the heating chamber lid 22 and the melt surface, or when melt raw material B containing oil or water, like briquette material, is used, gas derived from the water, oil, and the like, may stay on the lid lower surface, which may oxidize the melt raw material B when it comes up to the melt surface. In view of these, even when the top opening of the heating chamber is occluded with the heating chamber lid 22 so as not to leave a space from the melt surface, the outlet of the supply line 13 is preferably located in the lower part of the heating chamber 20.

On the other hand, in the melting/holding furnace 1 according to the present embodiment, as shown in FIGS. 2, 4, and 13, the screen plate 70 for metal melting which prevents surfacing of unmolten melt raw material B, is disposed so as to separate the lower part of the heating chamber 20, wherein the outlet of the supply line 13 is located, from the upper part above the outlet. With the screen plate 70 for metal melting, in particular, surfacing of the melt raw material B having a lower specific gravity compared with the melt M, like unmolten briquette material, in the heating chamber 20 is prevented, which allows secure melting in the absence of oxygen.

Further, the screen plate 70 for metal melting is formed of a material which may be placed submerged in the melt M, and in the form of a plate provided with a multitude of through holes 71 as shown in FIGS. 6 to 9. The unmolten melt raw material B supplied from the melting chamber 11 through the supply line 13 to the heating chamber 20 is supplied on the bottom side of the screen plate 70 for metal melting, where the melt raw material B is prevented from surfacing and held in the melt M to melt until it reaches a size to pass through the through holes 71 formed through the screen plate 70 for metal melting. The screen plate 70 for metal melting is not limited to the above, and may be anything that prevents surfacing of melt raw material B having a lower specific gravity compared with the melt M.

Further, as discussed above, with the outlet of the supply line 13 located in the bottom portion or deep lower position in the heating chamber 20, even when the screen plate 70 for metal melting is located deep in the heating chamber 20, the melt raw material B having a lower specific gravity compared with the melt M, like unmolten briquette material that has not been completely molten in the melting chamber 11, may be supplied to the lower side of the screen plate 70 for metal melting, which allows holding of the melt raw material B on the lower surface side of the screen plate 70 for metal melting deep in the heating chamber 20. In addition, sufficient time is ensured for the melt raw material B passed through the through holes 71 until it surfaces through the melt M, to allow the melt raw material B to melt during this time, which hardly allows the unmolten melt raw material B to reside in the upper part of the heating chamber 20 and be oxidized.

The number and the size of the through holes 71 formed through the screen plate 70 for metal melting are not particularly limited, and may suitably be decided taking into account the size and the melting rate of the melt raw material B to be supplied, the depth of placement and the distance from the melt surface of the screen plate 70 for metal melting, properties of the melt raw material B, and the like. The number and the size of the through holes may be decided so that the melt raw material B which has become the size to pass the through holes 71 is sufficiently molten in the melt until it comes up to the melt surface. Preferably, the number and the size of the through holes are designed so that the unmolten melt raw material B passes through the through holes to come up and melts before it reaches the melt surface in 2 to 3 minutes. Taking into account, for example, the general size of briquette material of aluminum scrap, the through holes 71 may preferably have a diameter of 20 to 50 mm.

Preferably, each through hole 71 may be in the form of a cylinder as shown in FIGS. 6 and 7, or tapered upwards as shown in FIGS. 8 and 9. With such configurations, unmolten melt raw material B is stuck in the through holes 71 and held in place without moving in the heating chamber 20, which promotes melting.

The material of the screen plate 70 for metal melting may be any material as long as it is capable of being placed submerged in the melt M, and may preferably be a refractory material, such as silicon carbide, zirconia-based materials, or fine ceramics.

The thickness of the screen plate 70 for metal melting is not particularly limited, and with the above-mentioned material, may be 20 to 80 mm for sufficient strength.

The screen plate 70 for metal melting may be installed in the heating chamber 20 by fixing the screen plate 70 on the bottom of the heating chamber 20, or by suspending the screen plate 70 from the ceiling of the heating chamber 20. The manner of installation is not limited. However, for arranging the immersion heaters 21, 21 inserted from above in the heating chamber 20 as in the embodiment, it is preferred to place the screen plate 70 for metal melting below the bottoms of the immersion heaters 21, 21 so as to avoid contact between the immersion heaters 21, 21 and the surfacing melt raw material B. It is also preferred to place the screen plate 70 for metal melting at 20% to 35% height from the bottom of the heating chamber 20. Further, as shown in FIG. 4, a plurality of screen plates 70 for metal melting may be provided in a multi-stage fashion in the heating chamber 20. Here, the screen plates 70 for metal melting may be different in diameter of the through holes 71. In that case, the diameter of the through holes 71 in the upper screen plate 70 for metal melting is preferably smaller than the diameter of the through holes 71 in the lower screen plate 70 for metal melting.

As discussed above, in the metal melting apparatus 10 according to the present invention, as well as the melting/holding furnace 1 according to the present invention in which the metal melting apparatus 10 is incorporated, by supplying, as melt raw material B, either one or a mixture of any combination of fresh material and scrap material, such as return scrap, briquette material, or machined chips, clear melt with little oxides may be obtained. Further with the metal melting apparatus 10 according to the present invention, the melting/holding furnace 1 according to the present invention in which the metal melting apparatus 10 is incorporated, as well as the screen plate for metal melting and a method of melting metal according to the present invention, and the metal melting apparatus 10 and the melting/holding furnace 1 provided with the screen plate 70 for metal melting, melt raw material B having a lower specific gravity compared with the melt M, like briquette material, may be molten without oxidation to obtain a clear melt M with little oxides.

DESCRIPTION OF REFERENCE NUMERALS

1: melting/holding furnace
2, 112: refractory material
3: outer shell
10: metal melting apparatus
20: heating chamber
21: immersion heater (immersion burner)
22: heating chamber lid
30: sedimentation chamber
40: drawing chamber
50: circulation chamber
51: communicating line
11, 101, 102: melting chamber
11A: supply port
13: supply line
13A: melting-chamber-side opening
13B: upper wall surface of supply line
14: gas injection system
14A: injection port
14B: injecting parts
14C: air line
14D: gas generating device
16: jet pump
17: nozzle
18: throat
G: inactive gas, gas, driving fluid
B: melt raw material
M: melt, driven fluid
70: screen plate for metal melting
71: through hole
114: magnetic stirrer
115: rotary shaft
116: impeller

The invention claimed is:

1. A method of melting metal comprising:
disposing, in a melt, a screen plate for metal melting in a form of a plate having a multitude of through holes so that a melt containing an unmolten melt raw material having a lower specific gravity compared with the melt is supplied on a bottom side of the screen plate for metal melting disposed in the melt, and melting the unmolten melt raw material by holding the unmolten melt raw material in the melt using the screen plate so as not to come up to a melt surface until the unmolten melt raw material reaches a size to pass through the through holes, and then by allowing the unmolten melt raw material to melt, when reached the size to pass through the through holes, until it surfaces through the melt.

2. The method of melting metal according to claim 1, wherein, in a heating chamber of metal melting apparatus including a melting chamber in which a melt raw material is supplied into the melt, and the heating chamber communicated with the melting chamber via a supply line and having heating means for heating the melt, the screen plate for metal melting is disposed so as to separate a heating-chamber-side opening of the supply line from space above the opening, and wherein the unmolten melt raw material having a lower specific gravity compared with the melt is transferred through the supply line into the heating chamber and is molten by holding the unmolten melt raw material in the melt so as not to come up to a melt surface until the melt raw material reaches a size to pass through the through holes, and then by allowing the unmolten melt raw material to melt, when reached the size to pass through the through holds, until it surfaces through the melt.

3. The method of melting metal according to claim 2, further comprising:

generating a vortex in the melt contained in the melting chamber to draw, by the vortex, the unmolten melt raw material supplied to the melting chamber, into the supply line for transfer to the heating chamber.

4. The method of melting metal according to claim 3, wherein the vortex is generated in the melt by injecting gas into the melt.

5. The method of melting metal according to claim 4, wherein the gas is an inert gas which is inactive to the melt.

* * * * *